May 29, 1934.   J. G. R. WOODVINE   1,960,654
STEAM GENERATOR WITH THERMOSTATIC CONTROL OF THE FEED SUPPLY AND HEATING
Filed Dec. 21, 1932
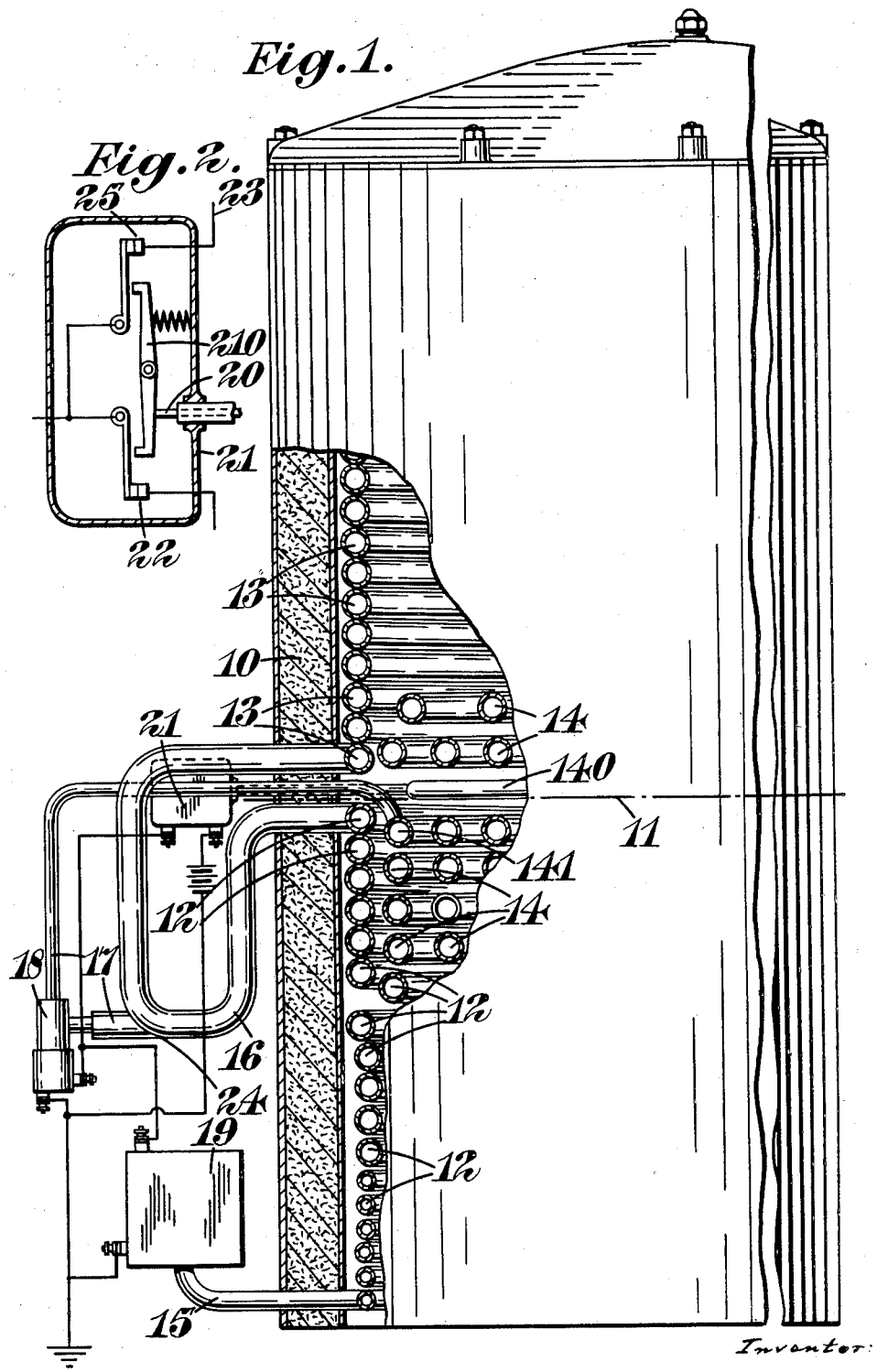
Inventor:
John George Reginald Woodvine
By [signature] Attorney Patented May 29, 1934

1,960,654

UNITED STATES PATENT OFFICE 1,960,654

STEAM GENERATOR WITH THERMOSTATIC CONTROL OF THE FEED SUPPLY AND HEATING

John George Reginald Woodvine, Shrewsbury, England

Application December 21, 1932, Serial No. 648,309
In Great Britain January 2, 1932

4 Claims. (Cl. 122—451.1)

This invention is for improvements in or relating to steam generators with thermostatic control of the feed supply, and if desired also of the heating means, and has for one of its objects to make the thermostat immediately responsive to the prevailing conditions in the generator.

There have been many attempts to employ thermostatic control in steam generators, but experience shows that the control obtained has not been sufficiently acute, there being a lag both in the commencement and in the discontinuation of the operation of the feed supply, and of the heating means. Also excessive fluctuations in temperature and pressure are liable to occur. In one proposal a certain proportion of feed water is taken directly from the pump delivery pipe to a point in the generator close to the thermostat, but this is open to the objection that when the pump is supplying only a small quantity of water it is liable to take the easiest course, namely to go straight to the thermostat and not pass through the ordinary water-heating coils of the generator. These latter coils therefore become denuded of water and get overheated whereas the thermostat being douched with cold feed water does not close down the heating means nor increase the supply of feed water.

The present invention provides a method of operating a thermostatically-controlled steam generator, according to which, when the thermostat energizes the feed water supply means, it also simultaneously withdraws a stream of fluid directly from a situation in the generator slightly below the normal water level but substantially above the feed water inlet and causes such stream to re-enter the circulatory path of the generator a short distance before the thermostat is reached, without passing through the greater portion of the normal circulatory path of the fluid in the generator which lies between the situation from which the stream is withdrawn and the thermostat. Thus it will be seen that before any of the feed water reaches the point from which the said withdrawal takes place it will be compelled to traverse the normal water heating part of the generator, and when the thermostat energizes the feed water supply means, the thermostat will immediately be subjected to the true conditions prevailing in the generator at the point from which the withdrawal takes place since it will have either water or steam traverse it according to the level of the water in the generator. The generator will therefore be made entirely automatic and it will not be possible for overheating or shortage of feed water to occur.

In carrying out the invention the thermostat may be located in the steam space of the generator and a valve-controlled conduit be provided leading directly to the circulation in said steam-space a short distance before the thermostat is reached, from a situation in the generator slightly below the normal water level but substantially above the feed water inlet, in such a manner as, when the valve is open, to by-pass that portion of the normal circulatory path of the fluid in the generator which lies between the situation of the intake end of the conduit and said portion of the steam-space at the delivery end of the conduit. An operative connection is provided between the thermostat and the valve whereby the thermostat opens the valve when the thermostat energizes the feed water supply means.

The aforesaid valve-controlled conduit may be arranged in various ways. Preferably it is a branch from a length of the generator tubing which constitutes part of the normal circulation system of the generator but is located outside the contour of the remainder of the generator tubing. This is a convenient arrangement to adopt in connection with cylindrical water tube generators. It is also preferred to have the said conduit branching outwardly in a curved form from a water tube which constitutes part of the normal circulation system of the generator, and during passage through which curved conduit the circulating fluid develops centrifugal force which, plus a drop in pressure which exists, projects a portion of this fluid through the conduit thereby by-passing a portion of the normal circulatory path of the fluid in the generator as set forth above.

For a more complete understanding of the invention there will now be described, by way of example only and with reference to the accompanying drawing, one constructional form of water tube steam generator according to the invention. It is to be understood, however, that the invention is not restricted to the precise constructional details set forth.

In this drawing—

Figure 1 is an elevation partly in section showing a portion of the steam generator, and Figure 2 is a detail sectional view on a scale larger than that of Figure 1.

Like reference numerals indicate like parts throughout the drawing.

In the steam generator illustrated the shell is indicated at 10 and is shown as enclosing a cylindrical column of spiral and helical tubes. The normal water level in the water tubes 12 is indicated at 11. The tubes 13 are steam tubes and the tubes 14, 140 and 141 superheater tubes and do not normally contain water. The direction of circulation through the superheater is such that the steam reaches the tube 140 from the tube 141. The thermostat is located in the tube 140. The feed water inlet 15 is at the bottom of the column of tubes. Slightly below the normal water level 11 there leads out from the uppermost of the turns of the tubes 12 a conduit 16 which returns immediately to the lowermost of the turns of the tubes 13 constituting the sole connection between these two tubes and therefore constituting part of the normal circulation system of the generator. The conduit 16 is, however, located outside of the contour of the remainder of the generator tubing. The centrifugal force developed in the passage of the fluid through the bend 24 of the tube 16 forces the stream of fluid through the conduit 17 which branches from the conduit 16 and is controlled by a valve contained in the casing 18. This said centrifugal force is supplemented by the pressure drop in the tubes in question. The conduit 17 leads to the superheater tube 141 which, as already mentioned, is traversed before the tube 140, in which the thermostat of the generator is located, is reached.

The valve for the conduit 17 is controlled by the thermostat so as to be opened by the thermostat when it energizes the feed water pump. The feed water pump is indicated at 19, but the heating means of the generator are not illustrated. When the thermostat opens the valve in the casing 18 a portion of the fluid in the conduit 16 will be projected through the conduit 17 and will therefore go directly to the tube 141 and thence to the thermostat in the tube 140, thereby, (as concerns the thus withdrawn fluid) omitting or by-passing the intervening part of the normal circulatory path of the generator. If there is water in the tubes 12 up to the level 11 then it will be water which will reach the thermostat from the conduit 17 and the thermostat will thereby be cooled and caused to close the valve in the casing 18, and shut down partially or wholly the feed pump 19; but if the water has fallen below the level 11 in the tubes 12, steam from the uppermost turn of the tubes 12 will reach the thermostat through the valve-controlled conduit 17 and the thermostat will not be cooled but will continue to maintain the valve open and the feed pump 19 in operation, and, in case the temperature continues to rise the heating means can, if desired, also be closed down by the thermostat. Water cannot pass directly, however, from the feed inlet to the thermostat but must always traverse the tubes 12.

Any suitable electromagnetic or other means may be employed for controlling the valve for the conduit 17. In the construction shown a member 20 operated by the thermostat is shown as reaching into a contact-box 21 and co-operating with a lever 210 which is controlled by a compression spring. When the pump is to be put into operation and the valve for the conduit 17 is to be opened, the member 20 is caused by the thermostat to withdraw sufficiently from the box 21 to permit the compression spring to take the lever into the position shown and permit the contacts 22 to close, under the influence of a spring, not illustrated. The drawing diagrammatically illustrates one suitable arrangement of the electric wiring. The lead 23 may be taken to the heating means for the generator if such heating means are thermostatically controlled. The contacts 25 are arranged to be opened by the lever 210 under the pressure of its compression spring and thus shut down said heating means if the steam temperature rises to such a degree as to cause the member 20 to withdraw sufficiently further out of the casing 21 than is shown in the drawing. Thus the control of the heating means occurs only if the energizing of the feed pump is insufficient to keep the temperature from rising above that for which contacts 22 are adjusted.

The invention is obviously not restricted to any particular arrangement of spiral or other heating tubes, nor to the other constructional details set forth.

I claim:

1. A thermostatically-controlled steam generator of the series type, having the thermostat located in the steam-space of the generator and having a valve-controlled conduit leading directly to the circulation in said steam-space a short distance before the thermostat is reached, from a situation in the generator slightly below the normal water level but substantially above the feed water inlet, in such a manner as, when the valve is open, to by-pass that portion of the normal circulatory path of the fluid in the generator which lies between the situation of the intake end of the conduit and said portion of the steam-space at the delivery end of the conduit, and an operative connection between the thermostat and the valve whereby the thermostat opens the valve when the thermostat energizes the feed water supply means.

2. A thermostatically-controlled water tube steam generator of the series type having the thermostat located in the steam space of the generator and having a valve-controlled conduit which is a branch from a length of the generator tubing which constitutes part of the normal circulation system of the generator but is located outside the contour of the remainder of the generator tubing, which branch conduit leads directly to the circulation in said steam-space a short distance before the thermostat is reached, from a situation in the generator slightly below the normal water level but substantially above the feed water inlet, in such a manner as, when the valve is open, to by-pass that portion of the normal circulatory path of the fluid in the generator which lies between the situation of the intake end of the conduit and said portion of the steam-space at the delivery end of the conduit, and an operative connection between the thermostat and the valve whereby the thermostat opens the valve when the thermostat energizes the feed water supply means.

3. A thermostatically-controlled water tube steam generator of the series type having the thermostat located in the steam-space of the generator and having a valve-controlled conduit which branches in curved form from a water tube which constitutes part of the normal circulation system of the generator, which branch conduit leads directly to the circulation in said steam-space a short distance before the thermostat is reached, from a situation in the generator slightly below the normal water level but substantially above the feed water inlet, in such a manner that, when the valve is open, the circulating fluid in passing through the curved conduit develops centrifugal force which, plus a drop in pressure which exists, projects a portion of the circulating fluid through the conduit, thereby by-passing that portion of the normal circulatory path of the fluid in the generator which lies between the situation of the intake end of the conduit and said portion of the steam-space at the delivery end of the conduit, and an operative connection between the thermostat and the valve whereby the thermostat opens the valve when the thermostat energizes the feed water supply means.

4. A thermostatically-controlled water tube steam generator of the series type having the thermostat located in the steam-space of the generator and having a valve-controlled conduit which branches in curved form from a water tube which constitutes part of the normal circulation system of the generator, but is located outside the contour of the remainder of the generator tubing, which branch conduit leads directly to the circulation in said steam-space a short distance before the thermostat is reached, from a situation in the generator slightly below the normal water level but substantially above the feed water inlet, in such a manner that, when the valve is open, the circulating fluid in passing through the curved conduit develops centrifugal force which, plus a drop in pressure which exists, projects a portion of the circulating fluid through the conduit, thereby by-passing that portion of the normal circulatory path of the fluid in the generator which lies between the situation of the intake end of the conduit and said portion of the steam-space at the delivery end of the conduit, and an operative connection between the thermostat and the valve whereby the thermostat opens the valve when the thermostat energizes the feed water supply means.

JOHN GEORGE REGINALD WOODVINE.